United States Patent [19]
McCoy

[11] Patent Number: 5,186,640
[45] Date of Patent: Feb. 16, 1993

[54] WIRING HARNESS ASSEMBLY

[75] Inventor: Phillip A. McCoy, Laotto, Ind.

[73] Assignee: Group Dekko International, Laotto, Ind.

[21] Appl. No.: 840,317

[22] Filed: Feb. 24, 1992

[51] Int. Cl.⁵ .......................................... H01R 25/00
[52] U.S. Cl. ..................................... 439/211; 439/215
[58] Field of Search ............... 439/207, 210, 211, 214, 439/215, 505, 652, 654

[56] References Cited

U.S. PATENT DOCUMENTS

| | | | |
|---|---|---|---|
| Re. 31,733 | 11/1984 | Haworth et al. | 439/31 |
| 4,043,626 | 8/1977 | Propst et al. | 439/215 |
| 4,060,294 | 11/1977 | Haworth et al. | 439/215 |
| 4,199,206 | 4/1980 | Haworth et al. | 439/215 |
| 4,203,639 | 5/1980 | VandenHoek et al. | 439/215 |
| 4,270,020 | 5/1981 | Kenworthy et al. | 439/210 |
| 4,370,008 | 1/1983 | Haworth et al. | 439/165 |
| 4,775,328 | 10/1988 | McCarthy | 439/211 |
| 4,781,609 | 11/1988 | Wilson et al. | 439/215 |
| 5,013,252 | 5/1991 | Nienhuis et al. | 439/215 |
| 5,096,434 | 3/1992 | Byrne | 439/215 |
| 5,104,332 | 4/1992 | McCoy | 439/215 |
| 5,112,240 | 5/1992 | Nienhuis et al. | 439/215 |

Primary Examiner—Gary F. Paumen
Attorney, Agent, or Firm—Barnes & Thornburg

[57] ABSTRACT

A wiring harness assembly includes a conductor carrying channel having a first end and a second end. A first socket is electrically coupled to the first end of the conductor carrying channel. A connector assembly is coupled to the second end of the conductor carrying channel. The connector assembly includes a body portion, a second socket coupled to the body portion and extending a first predetermined distance longitudinally outwardly from the body portion, and a third socket coupled to the body portion and extending a second predetermined distance, longer than the first predetermined distance, longitudinally outwardly from the body portion. The second and third sockets are configured to mate with a first socket coupled to a separate wiring harness assembly adjacent the second end of the conductor carrying channel to couple the two adjacent wiring harnesses electrically. The separate wiring harness assembly may be located in an adjacent wall panel.

25 Claims, 3 Drawing Sheets

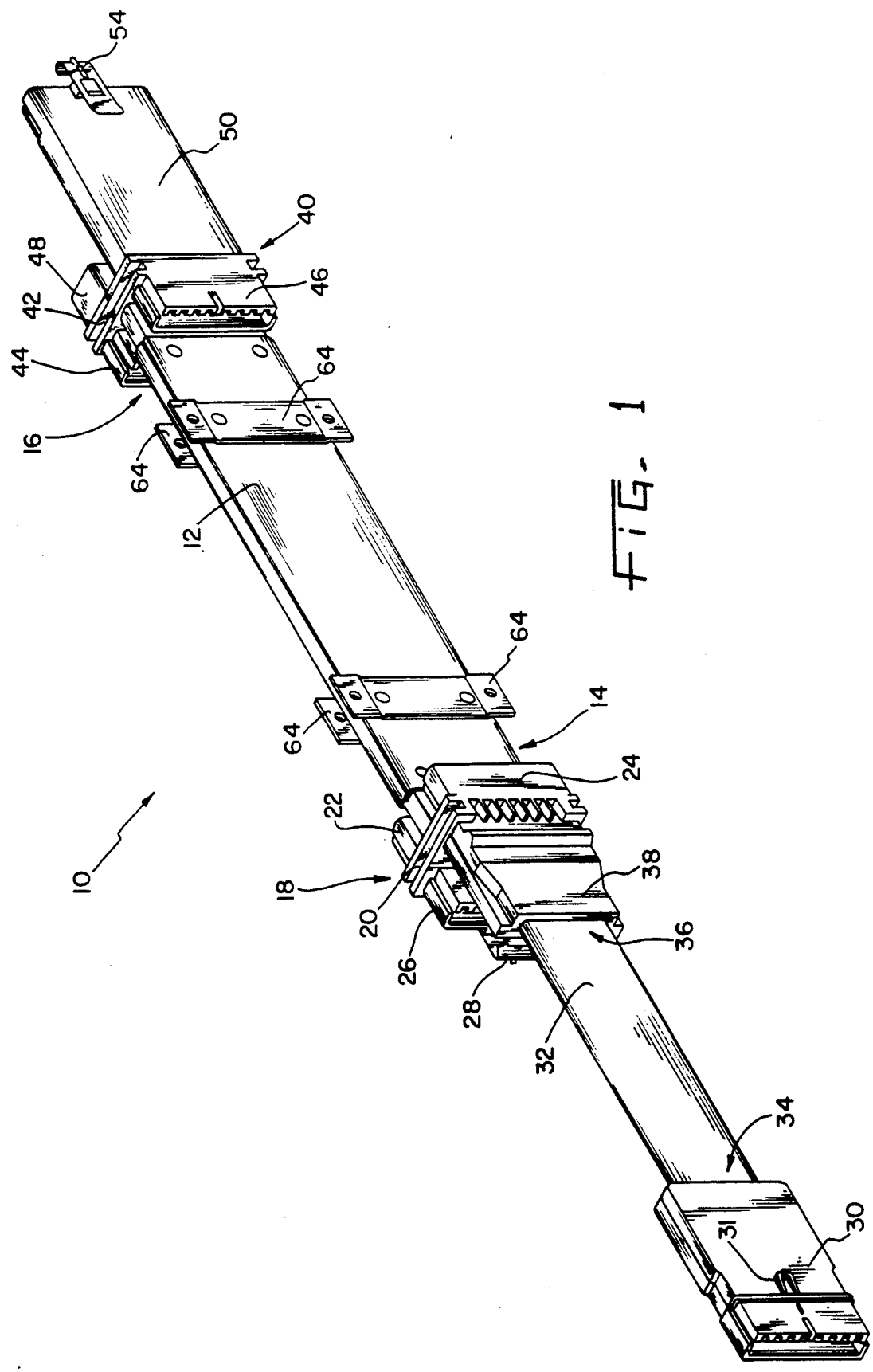

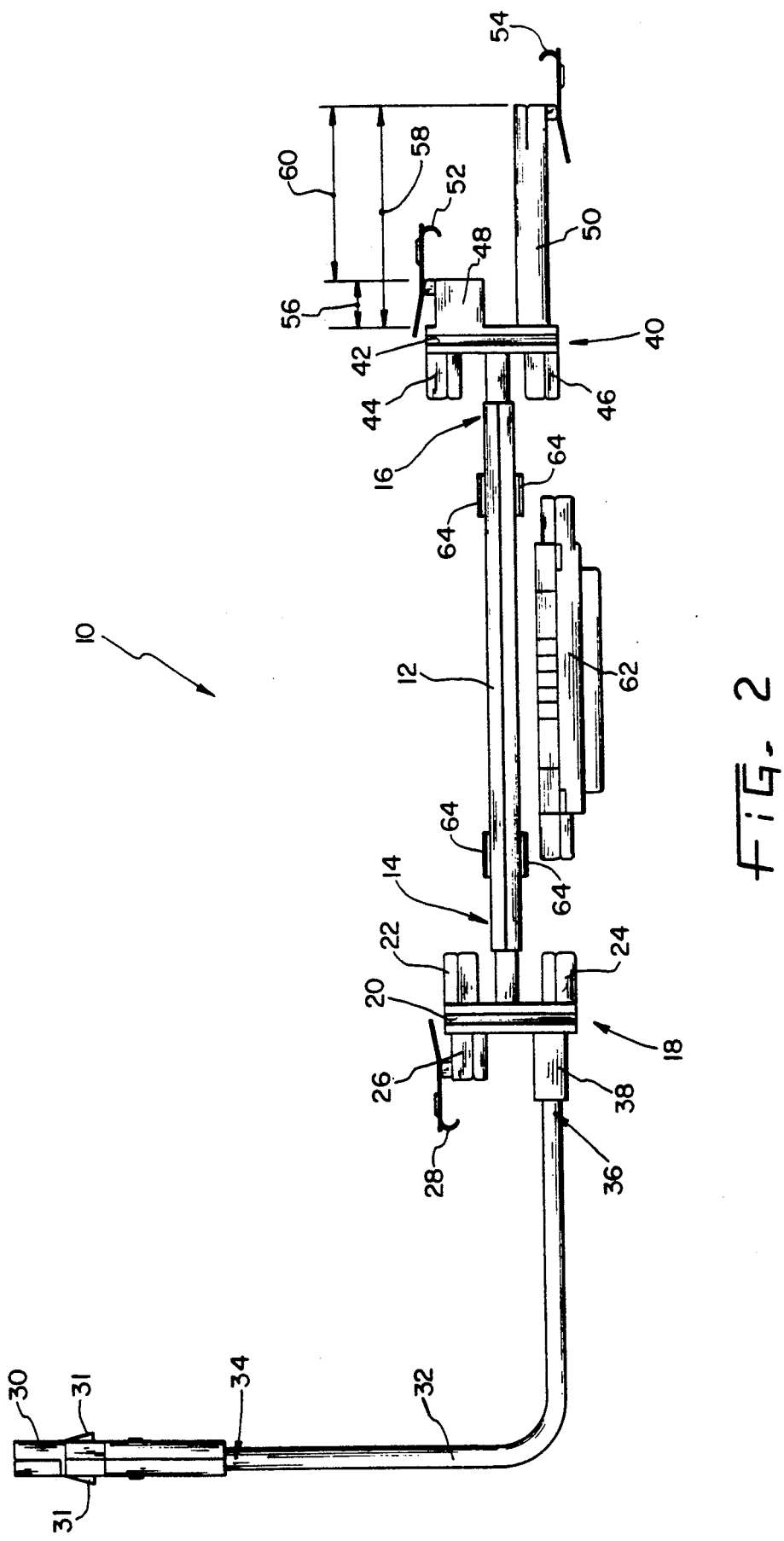

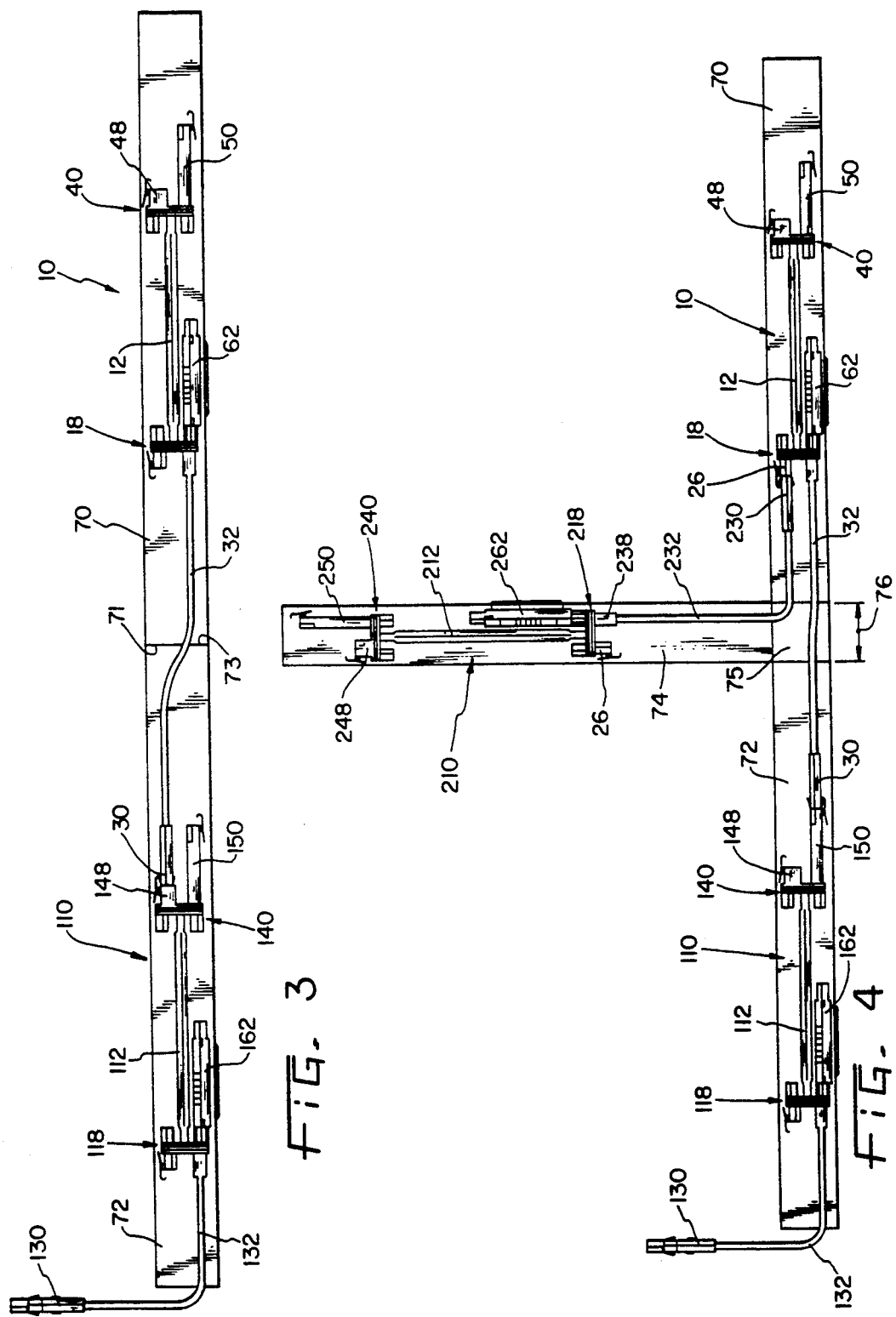

WIRING HARNESS ASSEMBLY

BACKGROUND AND SUMMARY OF THE INVENTION

This invention relates to a wiring harness assembly. More particularly, this invention relates to a wiring harness assembly for electrically coupling adjacent wall panel modules together to provide electrical power to a plurality of connected wall panels from a single power source.

Modern offices often use free-standing partitions or wall panels to form individual office cubicles in the open office environment These cubicles provide a proper working environment while maintaining versatility and mobility for unrestricted office organization and expansion. It is essential that each of the cubicles formed by the wall panels is provided with electrical power. Therefore, various modular wiring systems which permit adjacent panels to be coupled together electrically have been developed.

Wiring harnesses for electrically coupling adjacent wall panels are well known. Typically, a wiring harness has an elongated metal channel through which electrical conductors run. Electrical power is supplied to the harnesses, and adjacent harnesses located within the wall panels are electrically coupled so that more than one wall panel can be powered by a single power supply.

Wiring harnesses are typically either directional or non-directional. Directional wiring harnesses are sometimes referred to as "handed" harnesses. Non-directional wiring harnesses are sometimes referred as "non-handed" harnesses. In systems using non-directional or non-handed harnesses, individual wall panels can be aligned and joined together in any random orientation. In systems using directional or handed harnesses, wall panels must be aligned in either "right-to-left" or "left-to-right" orientation. Power can be fed to a plurality of wall panels through adjacent wiring harnesses in a directional manner (i.e., by powering the panels from a single point) or in a non-directional manner (i.e., by powering the panels from more than one point).

The preferred embodiment of the present invention illustrated in the accompanying drawings is a directional system which provides an improved wiring harness assembly to facilitate electrically coupling adjacent wall panels in a modular office system and to reduce the likelihood of powering the system more than once. In another embodiment of the present invention, the wiring harness assembly can be formed with hermaphroditic sockets at each end of the wiring harness. In this alternative embodiment, the wiring harness assembly can be utilized in a non-directional or non-handed system.

According to one aspect of the present invention, a wiring harness assembly includes a conductor carrying channel having a first end and a second end. A first socket is electrically coupled to the first end of the conductor carrying channel. A connector assembly is coupled to the second end of the conductor carrying channel. The connector assembly includes a body portion, a second socket coupled to the body portion and extending a first predetermined distance longitudinally outwardly from the body portion, and a third socket coupled to the body portion and extending a second predetermined distance, longer than the first predetermined distance, longitudinally outwardly from the body portion. The second and third sockets are configured to mate with a first socket coupled to a separate wiring harness assembly adjacent the second end of the conductor carrying channel to couple the two adjacent wiring harnesses electrically. For instance, the separate wiring harness assembly may be located in an adjacent wall panel.

According to another aspect of the present invention, the first socket is electrically coupled to the first end of the conductor carrying channel by a festoon connector having a first end non-removably coupled or hardwired to the first end of the conductor carrying channel and having a second end non-removably coupled to the female socket. Having the first socket non-removably coupled or hardwired to the first end of the conductor carrying channel eliminates the need to provide separate jumper connectors to couple adjacent wiring harnesses together electrically. Such a configuration also avoids the problem of losing loose jumpers when the wall panels are reconfigured.

According to yet another aspect of the present invention, at least one longitudinally inwardly facing socket is coupled to the first end of the conductor carrying channel and at least one longitudinally inwardly facing socket is coupled to the second end of the conductor carrying channel. These longitudinally inwardly facing sockets provide means for coupling the wiring harness assembly to a receptacle assembly to provide a convenience electrical outlet in the wall panels.

According to still another aspect of the invention, a longitudinally outwardly facing socket is electrically coupled to the first end of the conductor carrying channel. The longitudinally outwardly facing socket permits continuity at a three-way and four-way wall panel intersection by coupling to the first socket of a wiring harness assembly located in an adjacent wall panel.

Other objects, advantages and novel features of the present invention will become apparent from the following detailed description of the invention when considered in conjunction with the accompanying drawings.

BRIEF DESCRIPTION OF THE DRAWINGS

FIG. 1 is a perspective view of a preferred embodiment of the wiring harness assembly of the present invention.

FIG. 2 is a diagrammatical top plan view of the wiring harness assembly of FIG. 1 illustrating a configuration having a female socket at one end of the harness and first and second male plugs at an opposite end of the harness along with a receptacle assembly for use with the wiring harness.

FIG. 3 is a diagrammatical view illustrating the female socket of a first harness coupled to the first male plug of a second harness when two adjacent wall panels are directly coupled together.

FIG. 4 is a diagrammatical view illustrating a three-way connection of wall panels in which the female socket of a first wiring harness is coupled to the elongated second male plug in a second wiring harness.

DETAILED DESCRIPTION OF THE DRAWINGS

Referring now to the drawings, a preferred embodiment of the wiring harness assembly 10 of the present invention is illustrated in FIGS. 1 and 2. Harness assembly 10 includes a conductor carrying channel 12 having a first end portion 14 and a second end portion 16. Conductor carrying channel 12 provides a housing for receiving a plurality of conducting wires (not shown) therein which extend from first end portion 14 to second end portion 16. A first connector assembly 18 is electrically coupled to the conducting wires (not shown) at the first end portion 14 of channel 12. First connector assembly 18 includes a body portion 20 and two longitudinally inwardly facing male plugs 22 and 24. Connector assembly 16 also includes a longitudinally outwardly facing male plug 26 having a retaining clip 28 coupled thereto.

Harness assembly 10 also includes a female socket 30. Female socket 30 is coupled to connector assembly 18 by a festoon connector 32. Preferably, festoon connector 32 is flexible. However, festoon connector 32 may be rigid. Female socket 30 includes ears 31 which are engaged by a clip (28, 52, 54) of a male plug of an adjacent assembly to lock female socket 30 to the male plug as illustrated in FIG. 4. A first end 34 of festoon connector 32 is electrically coupled to female socket 30. A second end 36 of festoon connector 32 is integrally or non-removably formed with connector assembly 18 as illustrated at location 38. In other words, festoon connector 32 is hardwired to connector assembly 18 so that female socket 30 is not removable from harness assembly 10. This one-piece construction advantageously eliminates the need for loose panel jumpers which must be separately provided and which may be lost during reconfiguration of the wall panels. It is understood that an overmold or conduit connection may be used instead of festoon connector 32.

Harness assembly 10 further includes a second connector assembly 40 coupled to the conducting wires (not shown) at the second end 16 of channel 12. Second connector assembly 40 includes a body portion 42 and two longitudinally inwardly facing male plugs 44 and 46 located on opposite sides of channel 12. Connector assembly 40 is formed to include a first longitudinally outwardly facing male plug 48 and a second longitudinally outwardly extending male plug 50. Male plug 48 extends longitudinally outwardly from base 42 by a first predetermined distance illustrated by dimension 56 in FIG. 2. Second male plug 50 extends longitudinally outwardly from base portion 42 a second predetermined distance illustrated by dimension 58. The difference between the first predetermined distance 56 and the second predetermined distance 58 is illustrated by dimension 60 in FIG. 2. Preferably, the difference 60 between the first predetermined distance 56 and the second predetermined distance 58 is substantially equal to the thickness of a wall panel in which the wiring harness assembly 10 is installed as illustrated by dimension 76 in FIG. 4. The configuration of the first male plug 48 and the second, elongated male plug 50 on second connector assembly 40 provides flexibility when coupling adjacent wiring harnesses 10 together, as explained in more detail below with reference to FIGS. 3 and 4. Male plug 48 includes a clip 52 for securing female socket 30 to male plug 48. Elongated male plug 50 also includes a clip 54 for securing female socket 30 to elongated male plug 50.

Inwardly facing male plugs 22, 24, 44, and 46 are adapted to receive a standard 8-wire receptacle assembly 62 therein to provide an electrical outlet receptacle through the wall panel. Four different mounting brackets 64 are coupled to channel 12 for securing the receptacle assembly 62 to channel 12 in any one of four orientations depending on which of the male plugs 22, 24, 44, or 46 is selected for receiving receptacle assembly 62. Receptacle assembly 62 may also be spring mounted to channel 12.

Male sockets or plugs 26, 48, and 50 are specifically and identically keyed to accept female socket 30 on an adjacent wiring harness to couple two adjacent wiring harnesses together electrically. The embodiment of the present invention illustrated in FIGS. 1-4 is a directional system since a female-male-female-male orientation must be maintained between adjacent panels. Therefore, the orientation of wiring harnesses 10 cannot be reversed without interrupting the flow of power to an adjacent harness. However, it is understood that in another embodiment of the present invention, female socket 30 and male plugs 26, 48, and 50 could be replaced by hermaphroditic sockets having identical configurations. In this alternative embodiment, the wiring harness assembly would be non-directional or non-handed. It is also understood that in yet another embodiment of the present invention, the configuration of female socket 30 and male plugs 26, 48, and 50 could be reversed. In other words, female socket 30 could be replaced with a male plug and male plugs 26, 48, and 50 could be replaced with female sockets.

Male plug 26 on connector assembly 18 is provided to permit continuity at a three-way and four-way wall panel intersections as illustrated below in FIG. 4. Power entry to the preferred embodiment of the present invention is provided from a power source (not shown) coupled to female socket 30 of connector assembly 18.

Operation of the present invention is illustrated in FIGS. 3 and 4. Each of the wiring harness assemblies in FIGS. 3 and 4 are identical. For clarity, the second and third harness assemblies will be numbered in the 100's and 200's.

FIG. 3 illustrates the configuration of adjacent wiring harness assemblies 10 and 110 located inside adjacent wall panels 70 and 72, respectively. A vertical end 71 of wall panel 70 abuts a vertical end 73 of second wall panel 72. Female socket 30 of wiring harness assembly 10 is electrically coupled to the first male plug 148 of connector assembly 140 of wiring harness 110. Receptacle assembly 62 provides an electrical power outlet for wall panel 70, and receptacle assembly 162 provides an electrical power outlet for wall panel 72. Female socket 130 of wiring harness assembly 110 may be coupled to another adjacent panel (not shown) or to a power supply (not shown) to provide electrical power to wiring harnesses 10 and 110.

A three-way intersection of wall panels is illustrated in FIG. 4. In this arrangement, a post 75 is provided between wall panels 70 and 72. Festoon connector 32 of wiring harness 10 is not long enough to permit connection of female socket 30 with first male plug 148 of harness 110. Therefore, female socket 30 of harness 10 is electrically coupled to second, elongated male plug 150 of wiring harness 110. The thickness of post 75 is illustrated by dimension 76. A center wall panel 74 situated between first wall panel 70 and second wall panel 72 immediately adjacent post 75. Wall panel 74 includes a third wiring harness 210 therein. The thickness of wall panel 74 corresponds to dimension 76. The distance that second male plug 150 extends beyond first male plug 148 (illustrated by dimension 60 in FIG. 2) is substantially equal to dimension 76 of wall panel 74 and post 75. Therefore, when a post is provided between two adjacent panels, or when a three-way intersection is provided as illustrated in FIG. 4, harness 10 can be coupled to harness 110 without the use of an extension jumper, by simply coupling female socket 30 to male plug 150. The dual male plugs 148 and 150 permit easy connection of adjacent wiring harness assemblies 10 and 110 as the distance between wiring harness assemblies 10 and 110 varies. A single elongated male plug would require excessive bending of festoon connector 32 when adjacent wiring harness assemblies are located relatively close together as illustrated in FIG. 3. A relatively short male plug would not allow the harnesses to be connected, without an extension jumper or a longer festoon connector, when adjacent wiring harnesses are spaced apart as illustrated in FIG. 4.

In a three-way intersection as illustrated in FIG. 4, female socket 230 of wiring harness 210 is coupled to longitudinally outwardly extending male plug 26 on connector assembly 18. Female socket 230 is non-removably or integrally coupled by festoon connector 232 to connector assembly 218 at location 238. This configuration allows for electrical continuity in three-way intersections.

In a four-way intersection (not shown), female socket 30 of wiring harness 10 is coupled to the longitudinally outwardly extending male plug (identical to male plug 26) of the fourth wiring harness (not shown). The female socket (identical to female socket 30) of the fourth wiring harness (not shown) is coupled to the first male plug 148 of connector assembly 140 of wiring harness 110. This configuration allows for electrical continuity in four-way intersections.

From the preceding description of the preferred embodiments, it is evident that the objects of the invention are attained. Although the invention has been described and illustrated in detail, it is to be clearly understood that the same is intended by way of illustration and example only and is not to be taken by way of limitation. The spirit and scope of the invention are to be limited only by the terms of the appended claims.

What is claimed is:

1. A wiring harness assembly comprising:
a conductor carrying channel having a first end and a second end;
a first socket electrically coupled to the first end of the conductor carrying channel; and
a connector assembly coupled to the second end of the conductor carrying channel, the second connector assembly including a body portion, a second socket coupled to the body portion and extending a first predetermined distance longitudinally outwardly from the body portion, and a third socket coupled to the body portion extending a second predetermined distance, longer than the first predetermined distance, longitudinally outwardly from the body portion, the second and third sockets being configured to mate with a first socket coupled to a separate wiring harness assembly located adjacent the second end of the conductor carrying channel to electrically couple the two adjacent wiring harnesses.

2. The wiring harness assembly of claim 1, wherein said first predetermined distance differs from said second predetermined distance by a distance substantially equal to a thickness dimension of a wall panel in which the wiring harness assembly is installed.

3. The wiring harness assembly of claim 1, wherein the first socket is electrically coupled to the first end of the conductor carrying channel by a festoon connector having a first end integrally coupled to the first end of the conductor carrying channel and having a second end integrally coupled to the first socket.

4. The wiring harness assembly of claim 3, wherein the festoon connector is flexible.

5. The wiring harness assembly of claim 1, further comprising at least one longitudinally inwardly facing socket coupled to the first end of the conductor carrying channel and at least one longitudinally inwardly facing socket coupled to the second end of the conductor carrying channel for coupling the wiring harness assembly to a receptacle assembly.

6. The wiring harness assembly of claim 1, further comprising a longitudinally outwardly facing socket electrically coupled to the first end of the conductor carrying channel.

7. The wiring harness assembly of claim 6, further comprising first and second longitudinally inwardly facing sockets electrically coupled to the first end of the conductor carrying channel and located on opposite sides of the conductor carrying channel.

8. The wiring harness assembly of claim 7, wherein the connector assembly coupled to the second end of the conductor carrying channel includes third and fourth longitudinally inwardly facing sockets located on opposite sides of the conductor carrying channel.

9. A wiring harness assembly comprising:
a conductor carrying channel having a first end and a second end;
a first connector assembly electrically coupled to the first end of the conductor carrying channel;
a first socket electrically coupled to the first connector assembly;
a second connector assembly coupled to the second end of the conductor carrying channel, the second connector assembly including a body portion, a second socket coupled to the body portion and extending a first predetermined distance longitudinally outwardly from the body portion, and a second socket coupled to the body portion and extending a second predetermined distance, longer than the first predetermined distance, longitudinally outwardly from the body portion, the second and third sockets each being configured differently than the first socket to mate with a first socket coupled to a separate wiring harness assembly located adjacent the second end of the conductor carrying channel to electrically couple the adjacent wiring harnesses.

10. The wiring harness assembly of claim 9, wherein said first predetermined distance differs from said second predetermined distance by a distance substantially equal to a thickness dimension of a wall panel in which the wiring harness assembly is installed.

11. The wiring harness assembly of claim 9, wherein the first socket is electrically coupled to the first connector assembly by a festoon connector having a first end integrally coupled to the first connector assembly and having a second end integrally coupled to the first socket.

12. The wiring harness assembly of claim 9, wherein the first and second connector assemblies each include at least one longitudinally inwardly facing socket for coupling the wiring harness assembly to a receptacle assembly.

13. The wiring harness assembly of claim 12, wherein the first connector assembly includes first and second longitudinally inwardly facing sockets located on opposite sides of the conductor carrying channel.

14. The wiring harness assembly of claim 13, wherein the second connector assembly includes third and fourth longitudinally inwardly facing sockets located on opposite sides of the conductor carrying channel.

15. The wiring harness assembly of claim 9, wherein the first connector assembly includes a body portion and a longitudinally outwardly facing socket coupled to the body portion.

16. The wiring harness assembly of claim 15, wherein the first connector assembly further includes first and second longitudinally inwardly facing sockets located on opposite sides of the conductor carrying channel.

17. The wiring harness assembly of claim 16, wherein the second connector assembly includes third and fourth longitudinally inwardly facing sockets located on opposite sides of the conductor carrying channel.

18. A wiring harness assembly comprising:
a conductor carrying channel having a first end and a second end;
first socket means for coupling the wiring harness assembly to a second wiring harness assembly adjacent the first end of the conductor carrying channel, the first socket means being electrically coupled to the first end of the conductor carrying channel;
second socket means electrically coupled to the second end of the conductor carrying channel for electrically coupling the wiring harness assembly to a third wiring harness assembly adjacent the second end of the conductor carrying channel, the second socket means extending a first predetermined distance longitudinally outwardly from the second end of the conductor carrying channel, and third socket means coupled to the second end of the conductor carrying channel for electrically coupling the wiring harness assembly to the third wiring harness assembly, the third socket means extending a second predetermined distance, longer than the first predetermined distance, longitudinally outwardly from the second end of the conductor carrying channel, the second and third socket means each being configured to mate with the first socket means of the third wiring harness assembly to electrically couple the wiring harness assembly to the third wiring harness assembly.

19. The wiring harness assembly of claim 18, wherein said first predetermined distance differs from said second predetermined distance by a distance substantially equal to a thickness dimension of a wall panel in which the wiring harness assembly is installed.

20. The wiring harness assembly of claim 18, further comprising a first connector assembly coupled to the first end of the conductor carrying channel, the first socket means being electrically coupled to the first connector assembly by a festoon connector having a first end non-removably coupled to the first connector assembly and having a second end non-removably coupled to the first socket means.

21. The wiring harness assembly of claim 20, wherein the festoon connector is flexible.

22. The wiring harness assembly of claim 18, further comprising a first connector assembly coupled to the first end of the conductor carrying channel and a second connector assembly coupled to the second end of the conductor carrying channel, the first socket means being coupled to the first connector assembly and the second and third socket means being coupled to the second connector assembly, the first and second connector assemblies each being formed to include at least one longitudinally inwardly facing socket for coupling the wiring harness assembly to a receptacle assembly.

23. The wiring harness assembly of claim 22, wherein the first connector assembly further includes first and second longitudinally inwardly facing sockets located on opposite sides of the conductor carrying channel.

24. The wiring harness assembly of claim 23, wherein the second connector assembly includes third and fourth longitudinally inwardly facing sockets located on opposite sides of the conductor carrying channel.

25. The wiring harness assembly of claim 22, wherein the first connector assembly is formed to include a longitudinally outwardly facing socket.

* * * * *